(12) United States Patent
Kreutzer Orent et al.

(10) Patent No.: US 8,075,935 B2
(45) Date of Patent: Dec. 13, 2011

(54) METHODS AND SYSTEMS FOR BREWING VARIABLE AMOUNTS OF COFFEE

(75) Inventors: Jill Kreutzer Orent, Westport, CT (US); Barbara L Schnabel, Chappaqua, NY (US); David J Wanat, Meridan, CT (US); Joseph J Laskowski, Derby, CT (US); Silvana V Wheeler, Stamford, CT (US)

(73) Assignee: Conair Corporation, Stamford, CT (US)

(*) Notice: Subject to any disclaimer, the term of this patent is extended or adjusted under 35 U.S.C. 154(b) by 285 days.

(21) Appl. No.: 12/623,090

(22) Filed: Nov. 20, 2009

(65) Prior Publication Data

US 2010/0183778 A1 Jul. 22, 2010

Related U.S. Application Data

(60) Provisional application No. 61/116,692, filed on Nov. 21, 2008.

(51) Int. Cl.
*A23F 5/24* (2006.01)
(52) U.S. Cl. ........ 426/231; 426/594; 426/433; 426/520; 99/282; 99/283; 99/285; 99/323.3
(58) Field of Classification Search .............. 426/231, 426/594, 432–433, 520; 99/280–285, 323.3
See application file for complete search history.

(56) References Cited

U.S. PATENT DOCUMENTS

| | | | | |
|---|---|---|---|---|
| 1,831,013 | A * | 11/1931 | Kouyoumjian | 392/445 |
| 3,446,937 | A * | 5/1969 | Hugentobler | 392/490 |
| 3,691,933 | A * | 9/1972 | Martin | 99/282 |
| 3,757,669 | A * | 9/1973 | Holstein et al. | 99/280 |
| 4,608,916 | A * | 9/1986 | Becker et al. | 99/283 |
| 4,838,152 | A * | 6/1989 | Kubicko et al. | 99/280 |
| 4,944,217 | A * | 7/1990 | Watanabe | 99/280 |
| 4,974,500 | A * | 12/1990 | Boyd et al. | 99/279 |
| 5,233,914 | A * | 8/1993 | English | 99/282 |
| 5,311,812 | A * | 5/1994 | Smit | 99/280 |
| 5,953,981 | A * | 9/1999 | Lassota | 99/281 |
| 6,000,317 | A * | 12/1999 | Van Der Meer | 99/282 |
| 6,003,435 | A * | 12/1999 | Patel | 99/283 |
| 6,067,894 | A * | 5/2000 | Eugster | 99/285 |
| 6,164,191 | A * | 12/2000 | Liu et al. | 99/305 |
| 6,305,268 | B1 * | 10/2001 | Schamberg et al. | 99/283 |
| 6,741,180 | B2 * | 5/2004 | Lassota | 340/622 |
| 6,845,704 | B2 * | 1/2005 | Lassota et al. | 99/280 |
| 7,503,253 | B2 * | 3/2009 | Rahn | 99/280 |
| 8,037,811 | B2 * | 10/2011 | Bunn | 99/280 |
| 2010/0206175 | A1 * | 8/2010 | White et al. | 99/280 |

* cited by examiner

*Primary Examiner* — Drew E Becker
(74) *Attorney, Agent, or Firm* — Lawrence Cruz

(57) ABSTRACT

A method brewing a beverage or coffee, and an associated system, include a water reservoir having a fixed capacity, an electric pump, a steel vessel with an inlet and an outlet for water and with a heater for heating the water, a container for holding coffee grounds having a removable insert for selectively optimizing coffee strength including but not limited to optimizing for amount of coffee brewed, and an optional heater to keep brewed coffee at a desired temperature until dispensed.

6 Claims, 3 Drawing Sheets

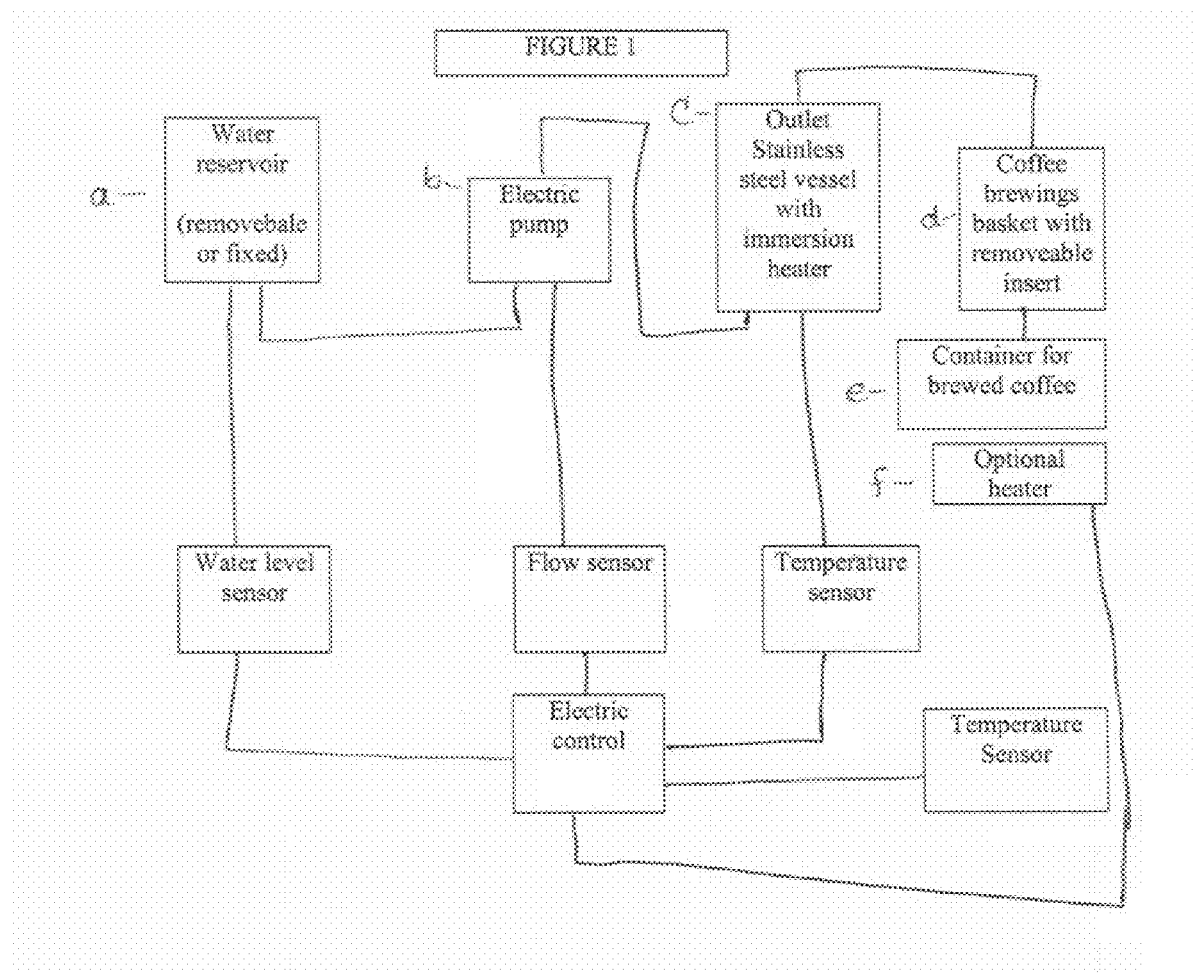

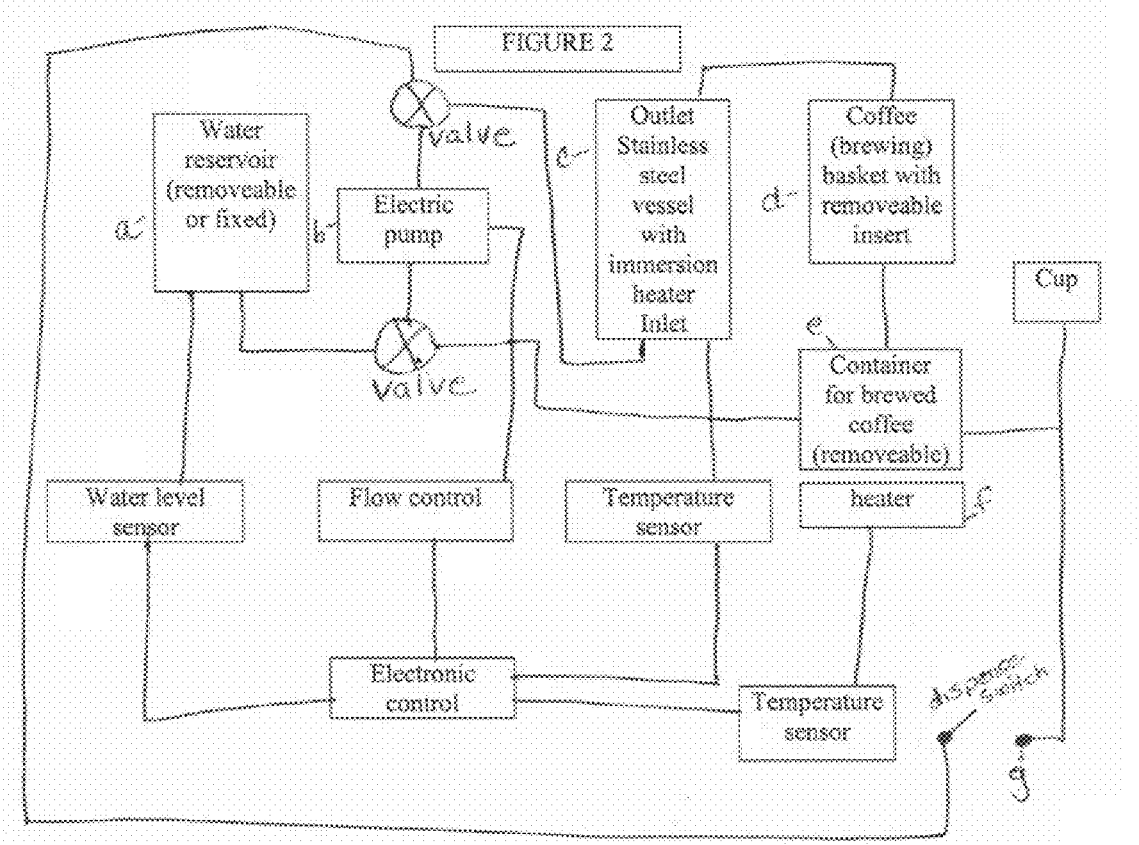

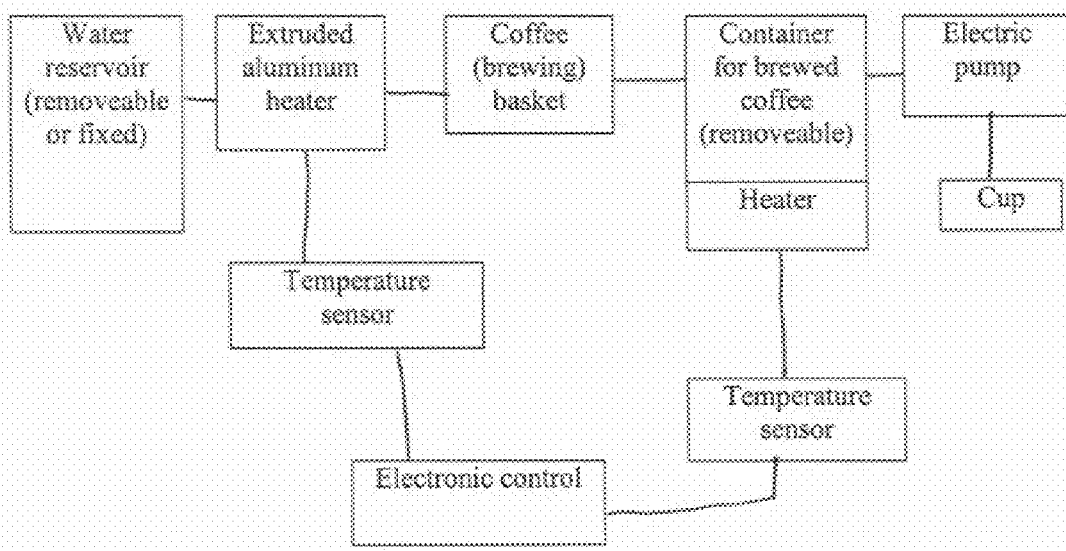

METHODS AND SYSTEMS FOR BREWING VARIABLE AMOUNTS OF COFFEE

BACKGROUND OF THE INVENTION

1. Field of the Invention

The present invention relates to beverage brewing appliances and methods and, more particularly, to methods and systems for selectively brewing variable amounts of coffee using a single appliance.

2. Description of Related Art

Various types of appliances for brewing hot beverages such as coffee exist in a variety of configurations. Certain appliances exist that can consecutively brew a single pot at a time or multiple pots if continuously refilled. Some can brew less than one pot, but to do so require the user to fill the water chamber with a limited amount of water that corresponds precisely to the amount of brewed beverage or coffee. It is desirable to provide a method of brewing and associated system or appliance that can be filled with an amount of water that does not necessarily correspond exactly to the amount of brewed beverage desired so that a user or users can selectively brew or serve individual servings of brewed beverage or coffee with only one or relatively few fillings of the water reservoir.

OBJECTS OF THE PRESENT INVENTION

It is an object of the present invention to provide a method or system for brewing coffee or beverages in which an appliance can be filled with an amount of water that does not necessarily correspond exactly to the amount of brewed beverage desired so that a user or users can selectively brew or serve individual servings of brewed beverage or coffee with only one or relatively few fillings of the water reservoir.

These and other objects are achieved by the present invention.

BRIEF SUMMARY OF THE PRESENT INVENTION

According to the present invention, a method brewing a beverage or coffee, and an associated system or method include a water reservoir having a fixed capacity, an electric pump, a steel vessel with an inlet and an outlet for water and with a heater for heating the water, a container for holding coffee grounds having a removable insert for selectively optimizing coffee strength including but not limited to optimizing for amount of coffee brewed, and an optional heater to keep brewed coffee at a desired temperature until dispensed.

BRIEF DESCRIPTION OF THE DRAWINGS

FIG. 1 is a diagram describing a method of brewing coffee according to a first embodiment of the present invention.

FIG. 2 is a diagram describing a method of brewing coffee according to a second embodiment of the present invention.

FIG. 3 is a diagram describing a method of brewing coffee according to a third embodiment of the present invention.

DETAILED DESCRIPTION OF THE PREFERRED EMBODIMENTS OF THE INVENTION

The preferred embodiments of the present invention describe methods and systems for brewing a hot beverage. While the examples described herein are intended to brew coffee, the present invention is not limited to coffee and it may be implemented with any of a variety of hot beverages.

Each of the three concepts below correspond to the flow diagrams in the drawing figures.

Coffee Concept 1

A method for brewing small to large quantities of coffee using a pump system consisting of (see FIG. 1):
- a) A water reservoir with a fixed capacity that may or may not be removable,
- b) An electric pump,
- c) A stainless steel vessel with an electric immersion heater with an inlet and outlet for water,
- d) A container to hold coffee grounds, with a removable insert to be used to optimize the strength of coffee when lesser amounts of coffee are brewed,
- e) A container to hold and dispense/pour the brewed coffee
- f) An optional heater to keep the brewed coffee at a desired temperature until it is dispensed/poured

Method of Operation

When power is supplied to the unit, the desired amount of coffee to be brewed is selected. A water sensor in the vicinity of the water reservoir determines if there is enough water in the reservoir to brew the selected amount of coffee. If there is an insufficient amount of water in the reservoir, the water level sensor sends a signal to the electronic control, and the electronic control alerts the user to add water to the reservoir. The electronic control then supplies power to the heater to heat the water in the stainless steel vessel to a predetermined temperature. When the desired temperature is attained, the temperature sensor sends a signal to the electronic control. The electronic control then supplies power to the pump, at a predetermined rate that varies the flow of water proportional to the amount of coffee being brewed. The cooler water is introduced into the stainless steel tank (inlet) and displaces the heated water (outlet) into the container holding the coffee grounds. The brewed coffee is then deposited into a separate container. As the heated water is being displaced in the stainless steel tank with cooler water, the temperature sensor sends a signal to the electronic control, and the electronic control supplies/removes power to the heater to maintain the predetermined temperature. When the selected amount of coffee is brewed, the electronic control removes power from the pump and heater. The electronic control then supplies power to the (optional) heater that applies heat to the container holding the brewed coffee.

Coffee Concept 2

A method for brewing small to large quantities of coffee using a pump system consisting of (see FIG. 2):
- a) A water reservoir with a fixed capacity that may or may not be removable,
- b) An electric pump,
- c) A stainless steel vessel with an electric immersion heater with an inlet and outlet for water,
- d) A container to hold coffee grounds, with a removable insert to be used to optimize the strength of coffee when lesser amounts of coffee are brewed,
- e) A container to hold and dispense/pour the brewed coffee
- f) An optional heater to keep the brewed coffee at a desired temperature until it is dispensed/poured g) A dispensing system consisting of a switch that activates two solenoid valves to divert the flow from the heating system to dispensing the brewed coffee to another container (cup).

Method of Operation

When power is supplied to the unit, the desired amount of coffee to be brewed is selected. A water sensor in the vicinity of the water reservoir determines if there is enough water in the reservoir to brew the selected amount of coffee. If there is an insufficient amount of water in the reservoir, the water level sensor sends a signal to the electronic control, and the electronic control alerts the user to add water to the reservoir. The electronic control then supplies power to the heater to heat the water in the stainless steel vessel to a predetermined temperature. When the desired temperature is attained, the temperature sensor sends a signal to the electronic control. The electronic control then supplies power to the pump, at a predetermined rate that varies the flow of water proportional to the amount of coffee being brewed. The water is introduced into the stainless steel tank (inlet) and displaces the heated water (outlet) into the container holding the coffee grounds. The brewed coffee is then deposited into a separate container. As the heated water is being displaced in the stainless steel tank with cooler water, the temperature sensor sends a signal to the electronic control, and the electronic control supplies/removes power to the heater to maintain the predetermined temperature. When the selected amount of coffee is brewed, the electronic control removes power from the pump and heater. The electronic control then supplies power to the (optional) heater that applies heat to the container holding the brewed coffee. To dispense the brewed coffee into another container (cup), a switch is activated and two solenoid valves divert the flow from the water heating system and the electric pump dispenses the brewed coffee from the holding container to another container (cup).

Coffee Concept 3

A method for brewing coffee and using a pump system to dispense the brewed coffee into another container (cup) consisting of (see FIG. 3):
  a) A water reservoir with a fixed capacity that may or may not be removable,
  b) An extruded aluminum heater,
  c) A container to hold coffee grounds,
  d) A removable container to hold the brewed coffee,
  e) An electric heater to keep the brewed coffee at a desired temperature until it is dispensed/poured,
  f) An electric pump, activated by a switch, to dispense the coffee into another container (cup).

Method of Operation

When power is supplied to the unit, the electronic control supplies power to the heater to heat the water in the extruded aluminum heater to a predetermined temperature. As the water is heated it is displaced from the heater into the coffee grounds container. Cooler water enters the heater and is displaced again. As this cycle continues, the brewed coffee is then deposited into a separate, removable container. When the brewing cycle is complete, the electronic control removes power from the heater. The electronic control then supplies power to the heater that applies heat to the container holding the brewed coffee. To dispense the brewed coffee into another container (cup), a switch is activated and an electric pump dispenses the brewed coffee from the holding container into a cup.

While the preferred embodiment has been disclosed, various modification can be made without departing from the scope of the present invention.

What is claimed is:

1. A method for brewing variable quantities of coffee using an automatic coffee making appliance, said method comprising
  adding water to a water reservoir with a fixed capacity;
  adding coffee grounds to a brew basket filter assembly;
  selecting a desired amount of coffee to be brewed and providing an input to said appliance;
  detecting the amount of water in the reservoir and comparing said amount of water in the reservoir to the input amount of desired coffee to be brewed;
  generating a signal indicative of a discrepancy between the amount of water in the reservoir and the input amount of desired coffee to be brewed, if such a discrepancy exists;
  supplying water from said reservoir to a water tank having a heater to heat water contained therein to a predetermined temperature;
  sensing when the heated water reaches said predetermined temperature;
  sending a signal to a controller to activate a pump that is adapted to operate said pump to cause it to pump said heated water to said brew basket and filter assembly to cause it to flow therethrough and into a coffee container, said controller limiting the duration of pump operation to a time that will pump an amount of heated water corresponding to the input amount of coffee to be brewed;
  causing said water from said reservoir to flow into said water tank to occupy some or all of the volume of the heated water displaced to said brew basket and filter assembly;
  sensing the temperature of the water in said water tank and controlling the heater in response thereto to maintain a predetermined temperature; and
  shutting off operation of said pump and said heater when an amount of heated water has been pumped that corresponds to said input amount of coffee to be brewed.

2. A method according to claim 1, further comprising dispensing said brewed coffee from said coffee container into a serving container.

3. A method according to claim 1, wherein said serving container is a single serving cup.

4. A method according to claim 1, wherein said coffee container is fixed to an assembly comprised of at least the reservoir and heater.

5. A method according to claim 1, wherein said coffee container is removably attached to an assembly comprised of at least the reservoir and heater.

6. A method according to claim 2, further comprising applying heat to said serving container.

* * * * *